(12) United States Patent
Pank

(10) Patent No.: US 7,875,190 B2
(45) Date of Patent: Jan. 25, 2011

(54) COMBINATION PHYSICAL SEPARATOR AND FILTER DEVICE TO REMOVE CONTAMINANTS FROM STORMWATER RUNOFF

(76) Inventor: Thomas E. Pank, 10546 Harp Rd., Walkersville, MD (US) 21793

( * ) Notice: Subject to any disclaimer, the term of this patent is extended or adjusted under 35 U.S.C. 154(b) by 0 days.

(21) Appl. No.: 12/074,673

(22) Filed: Mar. 5, 2008

(65) Prior Publication Data

US 2008/0217257 A1 Sep. 11, 2008

Related U.S. Application Data

(60) Provisional application No. 60/905,612, filed on Mar. 7, 2007, provisional application No. 60/905,520, filed on Mar. 7, 2007.

(51) Int. Cl.
*B01D 21/02* (2006.01)
*B01D 36/04* (2006.01)

(52) U.S. Cl. .............. 210/747; 210/800; 210/804; 210/170.03; 210/254; 210/299; 210/521; 210/532.1; 210/538

(58) Field of Classification Search .............. 210/747, 210/767, 800, 170.03, 254, 521, 532.1, 538, 210/540, 804, 299
See application file for complete search history.

(56) References Cited

U.S. PATENT DOCUMENTS

| 1,778,326 | A |   | 10/1930 | Kutzer |
|---|---|---|---|---|
| 3,862,040 | A | * | 1/1975 | Preus et al. .................. 210/540 |
| 5,433,845 | A | * | 7/1995 | Greene et al. .......... 210/170.03 |
| 5,746,911 | A |   | 5/1998 | Pank |
| 6,077,448 | A | * | 6/2000 | Tran-Quoc-Nam et al. .. 210/521 |
| 6,264,835 | B1 |   | 7/2001 | Pank |
| 6,315,897 | B1 | * | 11/2001 | Maxwell ................ 210/170.03 |
| 6,547,962 | B2 | * | 4/2003 | Kistner et al. .......... 210/170.03 |
| 6,783,683 | B2 | * | 8/2004 | Collings .................. 210/532.1 |
| 7,314,549 | B2 | * | 1/2008 | Swift ..................... 210/170.03 |
| 2002/0139736 | A1 | * | 10/2002 | Stever et al. ................ 210/170 |
| 2005/0103698 | A1 | * | 5/2005 | Eberly ..................... 210/532.1 |
| 2005/0109707 | A1 | * | 5/2005 | Bryant ....................... 210/747 |

\* cited by examiner

*Primary Examiner*—Christopher Upton
(74) *Attorney, Agent, or Firm*—Zito tlp

(57) ABSTRACT

An input chamber receives runoff water to be cleaned. Part of the way up the chamber wall is a restricted outlet which feeds a system for cleaning the water. At a still higher elevation another opening allows runoff water to flow to an extended detention chamber. Near the top of the chamber is an outlet pipe. A vertical baffle in front of the outlet cleans water that flows under the baffle on its way to the outlet. When the incoming flow rate is very high, water passes over the baffle to the outlet.

4 Claims, 3 Drawing Sheets

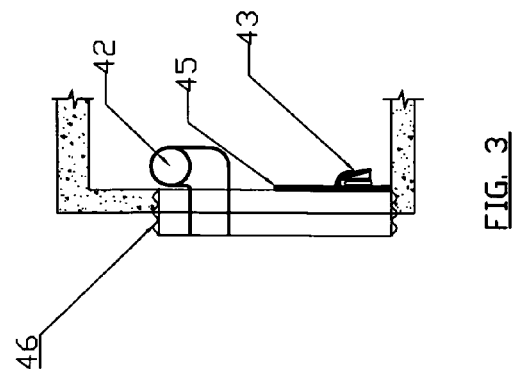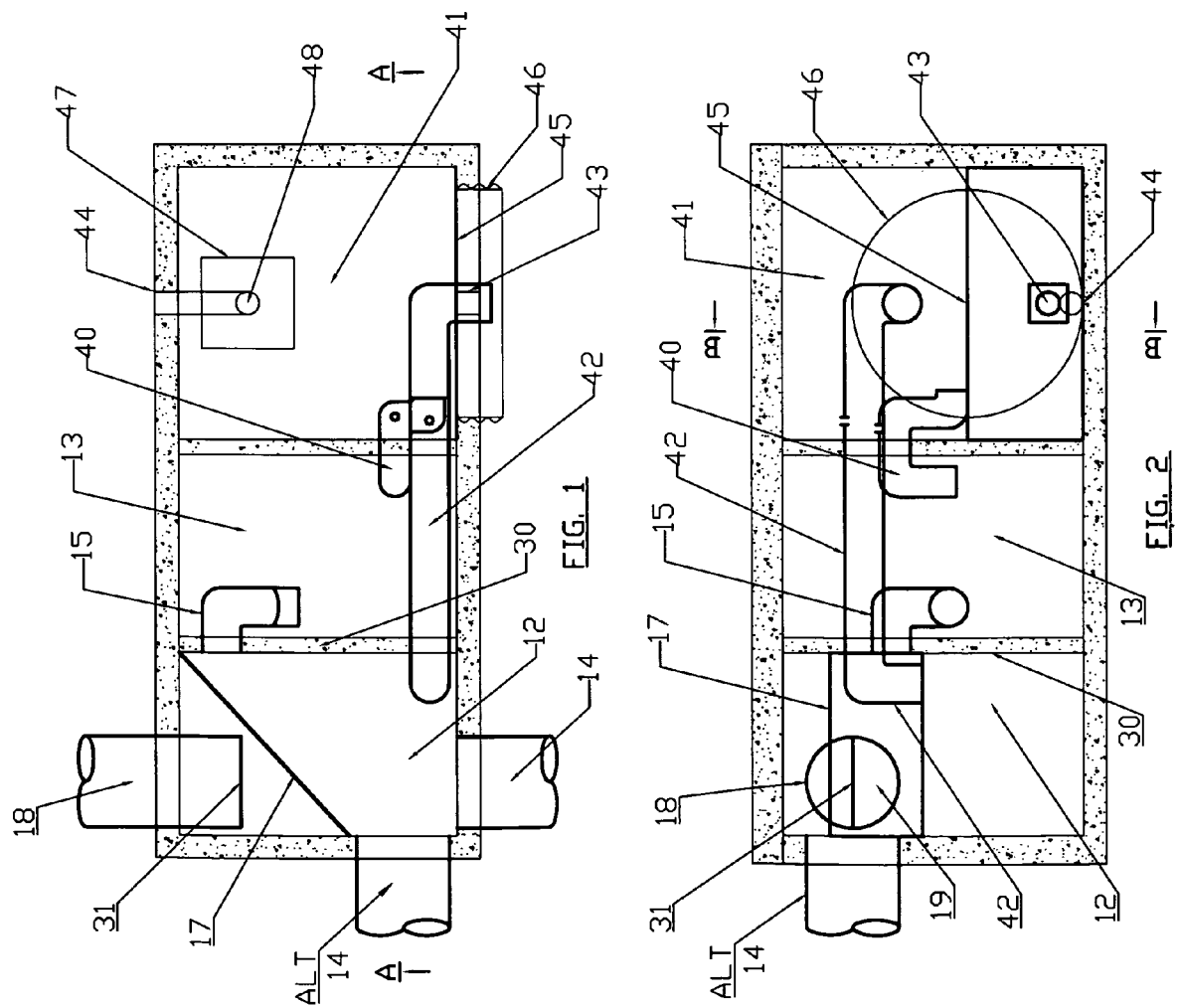

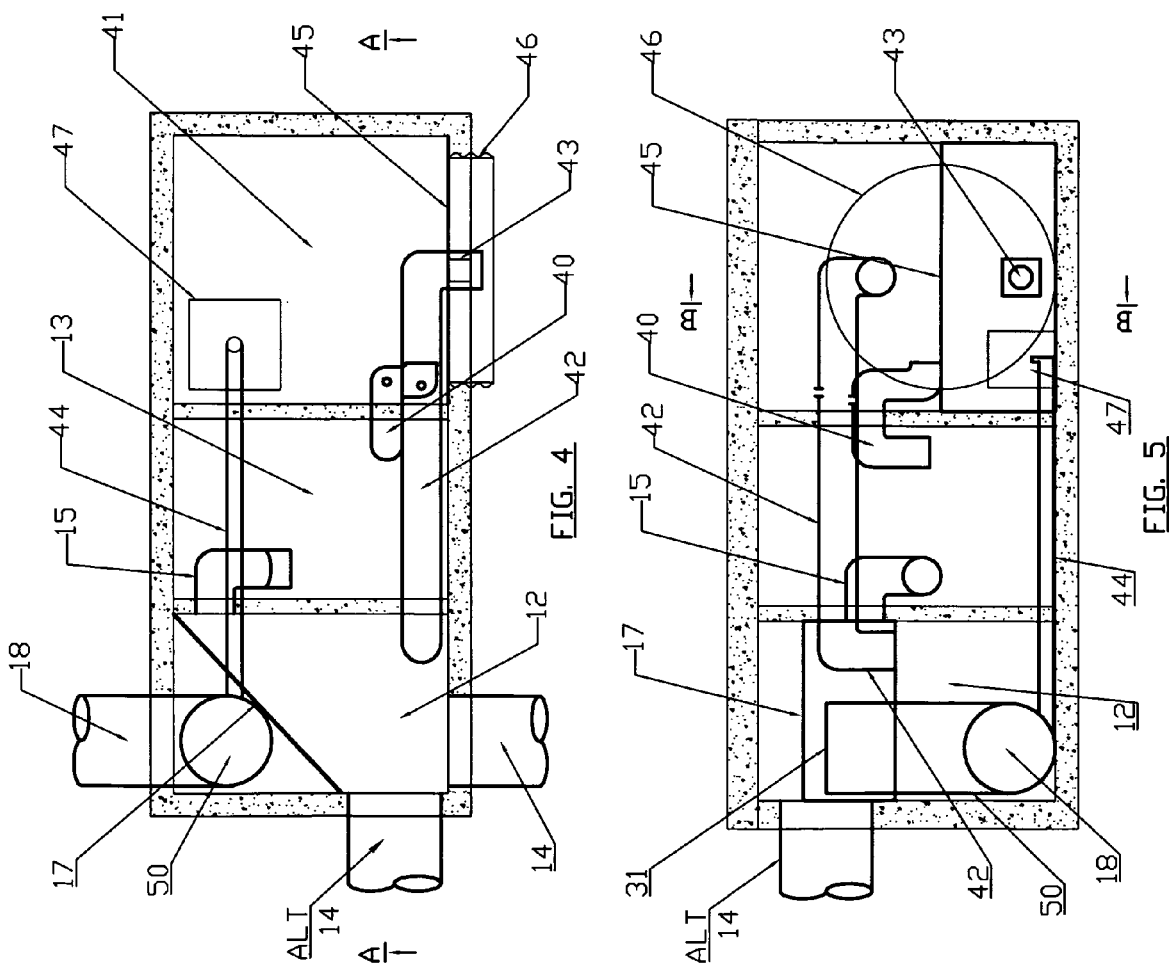

COMBINATION PHYSICAL SEPARATOR AND FILTER DEVICE TO REMOVE CONTAMINANTS FROM STORMWATER RUNOFF

RELATED CASES

I claim the benefit of (a) my prior provisional application Ser. No. 60/905,612 filed Mar. 7, 2007 and (b) my prior provisional application Ser. No. 60/905,520 filed Mar. 7, 2007.

BACKGROUND OF THE INVENTION

When it rains on a parking lot, a road, or other impervious surface, the water will not permeate into the ground as it once did, and instead this water will runoff and discharge directly into a stream or receiving body. Since these impervious surfaces typically have vehicles or traffic on them, an accumulation of pollutants will occur between rain events. This runoff is then concentrated because it is unable to be absorbed into the ground, and the pollutants are concentrated as well. This has caused a severe degradation of our waterhsheds. Although many technologies now exist to treat this problem, a single structure multistage treatment system has advantages of ease of maintenance, better efficiency, lower cost, and longer life.

SUMMARY OF THE INVENTION

When runoff water is cleaned, according to the present invention, there are three levels of flow. The first of the three levels is herein referred to as low flow. This level of flow involves a substantial cleaning by any suitable cleaning method, old or new, such as gravity separation (see for example Pank U.S. Pat. Nos. 5,746,911 and 6,264,835), or by filtering (Pank U.S. application Ser. No. 11/030,939, filed Jan. 7, 2005, and Pank U.S. publication no. U.S. -2007-0023352-A1 dated Feb. 1, 2007).

When the incoming flow rate exceeds the maximum low rate of flow the excess flow, up to a predetermined level, is diverted to an extended detention chamber where it is stored. The maximum flow rate of runoff water comprising said low rate of flow plus said excess is hereby defined as an intermediate rate of flow.

The high flow rate exceeds the intermediate rate.

The portion of the intermediate flow that does not exceed the low flow rate is cleaned by the same cleaning method and apparatus as though it was water at a low rate of flow.

Similarly, that portion of the high rate of flow, which does not exceed the intermediate flow rate, is cleaned as fully as though it was at said intermediate flow rate.

If cleaning of the water in said extended detention chamber is deemed necessary, such water may be passed from such chamber through a filter, or other cleaning device, before it is fed to an outlet.

To save space, part of the extended detention chamber may be below the elevation of the outlet that is fed by the extended detention chamber, in which case the invention contemplates that the lower portion of the extended detention chamber be emptied by siphoning.

BRIEF DESCRIPTION OF THE DRAWINGS

FIG. 1 is a plan view of the preferred form of the invention.
FIG. 2 is a sectional view along line A-A of FIG. 1.

FIG. 3 is a cross-sectional view of parts 42, 45 and 46 of FIGS. 1 and 2.
FIG. 4 is a plan view of a modified form of the invention.
FIG. 5 is a cross-section along line A-A of FIG. 4.

DETAILED DESCRIPTION

Figure 7:
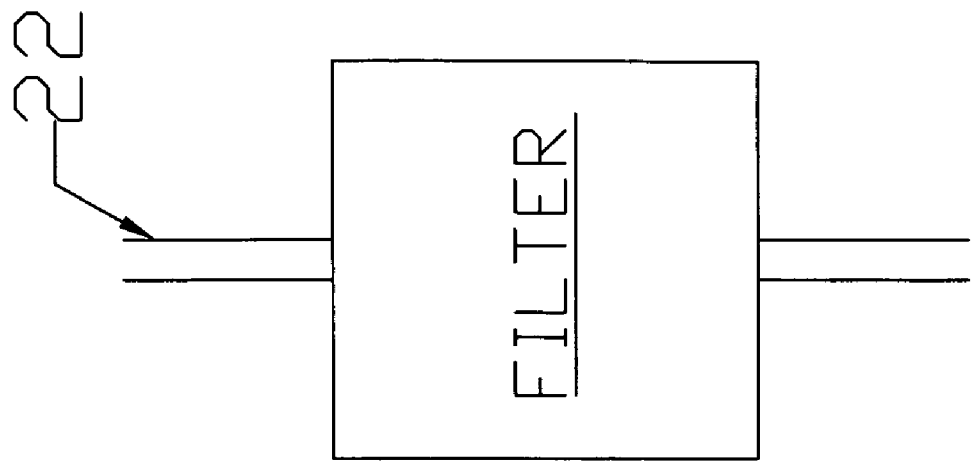
FIGS. 6 and 7 are schematic drawings of two modifications that may be made.

During low flow conditions, influent water enters the device through the inlet pipe 14 from which it flows directly into the primary chamber 12, causing the water level in chamber 12 to rise. When the water level in the primary chamber 12 rises, water is skimmed from the surface of that chamber by a pipe 15 that penetrates the wall 30 between the two chambers 12 and 13. This pipe delivers the inflow water to the storage chamber 13, where it enters horizontally below the water surface through a 90 degree fitting in the pipe 15. When the water enters the storage chamber 13, the entrained sediments and floatables separate from the water stream—sediments settle to the structure floor and oils rise to the water surface. The additional water entering the storage chamber 13 through pipe 15 displaces clean water from the center of the column of chamber 13 and this storage outflow enters the storage chamber outlet pipe 40 and flows into the filtration chamber 41. The treated water enters the filtration chamber horizontally through a 90 degree fitting on the storage chamber outlet pipe 40.

The extended detention chamber 46 has a large portion thereoof below the level of pipes 40 and 42, hence any water flow in pipes 40 and 42 will tend to fill the extended detention chamber 46. The extended detention chamber 46 is high enough to feed water by gravity through filters 47 to output 44, so that once flow begins from the extended detention chamber to output 44, via filters 47, a siphon effect can empty nearly all, if not all, of the water in the extended detention chamber 46.

When the flow rate into the device increases to a rate above said low flow conditions, a second flow path is added in addition to the ones employed for said low flow conditions. When the water level in the primary chamber 12 rises to a point higher than the horizontal invert of the secondary flow pipe 42, water begins to flow into the secondary flow pipe 42 from below the water surface of the primary chamber 12. This secondary treatment flow is free of oils and other floatable pollutants, and it is conveyed through the storage chamber 13 via pipe 42. The geometry (small diameter, for example) of the secondary flow pipe 42 limits the flow rate through this path in such a way as to continue sedimentation in the primary chamber 12 throughout design conditions as well as to accommodate the low flow paths as outlined above.

The low flow, via pipes 40 and/or 42, into the filtration chamber 41 ensures that the first flow to arrive at chamber 41 is used to "prime" the filter devices and thereby enable full filtration flow to occur immediately. There is a one-way valve 43 located in the extended detention weir plate 45. As water enters the filtration chamber, the one way valve 43 will be held shut by the pressure difference between this chamber and the water in the extended detention pipes. The seal on valve 43 does not need to be perfect; a restricted condition is all that is necessary. Once the water elevation in filtration chamber 41 is high enough, the filters are primed and flow through the filters will begin. At this point excess water flow goes over the extended detention weir 45 and into the extended detention chamber 46. After the storm subsides and the filtration chamber 41 drains down, the cartridges go into siphon, and the flap valve 43 opens and releases the water from the extended detention chamber 46 into the filtration chamber 41.

For runoff flow rates up to the device's design treatment flow rate, 100% of the water that enters the device system is treated by both the physical separation in first stage of the device (through chambers 12 and 13) and the media filtration of the second stage in the filtration chamber 41. When the influent flow rate is greater than the filtration capacity of the devices, but less than the maximum treatment flow rate of the first stage of the device, the excess water is diverted to the extended detention chamber 46, where it is stored until it can be released through the one way valve 43 to the filtration chamber 41 at a low flow rate. In the filtration chamber 41, the water is passed through the filter cartridge(s) 47, and then collected in an underdrain manifold 48 and discharged through the treated water outlet pipe 44. If the extended detention chamber 46 is full, the treatment continues because as the water enters the primary chamber 12, it must flow below the baffle 17 and then over the outlet control weir 31 to the outlet pipe 18.

The baffle 17, the outlet basin 19, the outlet baffle 31 and the output conduit 18 of this case have the same position relative to each other and to the walls of vault 10 as do parts 17, 18, 19, 31 of FIGS. 1 and 2 of my copending application filed Mar. 5, 2008.

When the runoff flow rate into input 14, exceeds the treatment capacity of all of the parts hereinabove described (in chambers 12, 13, and 41), this very high flow passes over the top of baffle 17 and from there unrestricted into outlet pipe 18. Outlet pipe 18 and treated water from outlet pipe 44 may be directed to different outfalls, or may be recombined downstream into a single outlet pipe. When the very high flow passes over baffle 17 to output 18, the incoming water also continues to follow the paths outlined for intermediate flow.

MODIFIED FORM OF THE INVENTION

Figure 6:
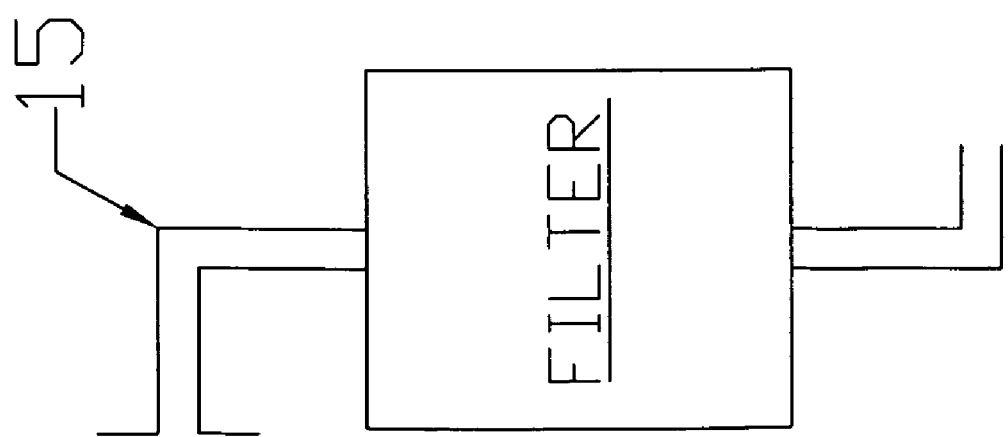

FIGS. 4 to 7 are modifications of the system of FIG. 3. Similar parts in the preferred form (FIGS. 1 to 3) and the modifications of FIGS. 4 to 7 have similar reference numbers.

In the modified form of the invention, the two effluent flow streams (treated effluent and overflow effluent) are combined into a single outflow stream within the device itself. This modified form is shown in FIGS. 4 and 5.

During runoff flow up to the design treatment capacity of the first stage of the invention, the modified form functions identically to the preferred form of the invention. The treated water effluent in pipe 44, however, does not exit the device. Instead the treated water outlet 44 flows into a vertical standpipe 50 in the primary chamber 12 of the device. At the floor of the structure, standpipe 50 makes a 90 degree bend and exits the device through a penetration in the outer wall and becomes outlet pipe 18.

When flow into the device exceeds the treatment capacity of the first stage of the device, excess water flows over the top of the standpipe 50 and directly downward to outlet pipe 18. This excess flow is combined with the treated effluent from pipe 50 and the combined flow is discharged to a single outlet pipe.

FIG. 8 shows that a filter may be substituted for the gravity cleaning system of chamber 13.

FIG. 9 shows that a filter, or other type of water cleaning device may be inserted in pipe 22.

When a filter is referred to it may be of the type set forth in my copending formal application Ser. No. 11/030,939.

I claim to have invented:

1. The method of cleaning runoff water which has a variable rate of flow, comprising:
   providing a first chamber, for receiving and holding runoff water;
   feeding runoff water, to be cleaned, to said first chamber,
   transferring water from a first elevation within said first chamber, to a storage chamber via gravity flow,
   transferring water from said storage chamber from an elevation below said first elevation to a height above said first elevation and back down into a filtration chamber;
   providing an extended detention chamber, and
   transferring water from said first chamber at a second elevation that is lower than said first elevation, elevating said water above said first elevation to a third elevation and then delivering the water from said second elevation to said extended detention chamber when the water in said first chamber exceeds said third elevation;
   filtering said water in said filtration chamber;
   discharging said water from said filtration chamber after said filtration;
   providing flow between said extended detention chamber and said filtration chamber when said water in said extended detention chamber rises above a predetermined level;
   providing flow between said extended detention chamber and said filtration chamber when said water in said filtration chamber is discharged through said filter down to a predetermined level;
   discharging water from said first chamber at an elevation higher than said first, second and third elevations when the water level in said first chamber exceeds said third elevation.

2. The method of cleaning runoff water which has a variable rate of flow as defined in claim 1, in which said method includes employing gravity separation to clean the water.

3. Apparatus for cleaning runoff water which has a variable rate of flow, comprising:
   a first chamber for receiving and holding runoff water;
   an input for feeding runoff water, to be cleaned, to said first chamber;
   a low flow conduit for receiving water from a first elevation within said first chamber;
   a storage chamber for receiving said water from said low flow conduit via gravity;
   a filtration chamber having a outlet for discharge of water cleansed by said apparatus;
   a second low flow conduit for receiving water from said storage chamber at an elevation below said first elevation and for delivering said water over said first elevation and down into said filtration chamber;
   a filter at said outlet of said filtration chamber, for cleaning the water received in said filtration chamber before said water passes to said outlet;
   an extended detention chamber connected to said filtration chamber by a weir which blocks flow between said filtration chamber and said extended detention chamber to a weir level, and a valve which is held closed by water retained in said filtration chamber,
   an intermediate flow conduit for receiving water from said first chamber at an second elevation below said first elevation, said intermediate flow conduit rising to a third elevation above said first elevation, for delivering the water from said second elevation to said extended detention chamber when the water in said first chamber exceeds said third elevation; and an outlet for discharging water from said first chamber at an elevation higher than said first, second and third elevations; wherein:

water from said low flow conduits fills said filtration chamber to prime said filter and close said valve, whereby water in said extended detention chamber is retained until the low flow water is filtered or the level within said extended detention chamber exceeds said weir level.

4. Apparatus for cleaning runoff water which has a variable rate of flow as defined in claim 3, which cleans water by separating the water from impurities by gravity.

* * * * *